(12) United States Patent
Mattes

(10) Patent No.: US 6,536,259 B2
(45) Date of Patent: Mar. 25, 2003

(54) DEVICE FOR SENSING A SIDE IMPACT IN A MOTOR VEHICLE

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/057,454

(22) Filed: Jan. 24, 2002

(65) Prior Publication Data

US 2002/0112526 A1 Aug. 22, 2002

(30) Foreign Application Priority Data

Jan. 24, 2001 (DE) .......................... 101 03 047

(51) Int. Cl.[7] .............................. G01N 3/317; G01F 1/00
(52) U.S. Cl. ..................... 73/12.09; 73/12.01; 73/12.04
(58) Field of Search .............................. 73/12.01, 12.04, 73/12.09

(56) References Cited

U.S. PATENT DOCUMENTS

| | | | | |
|---|---|---|---|---|
| 5,231,253 A | * | 7/1993 | Breed et al. .......... 200/61.45 R |
| 5,454,590 A | * | 10/1995 | Haland .................... 280/734 |
| 5,756,948 A | * | 5/1998 | Husby et al. ............. 200/61.53 |
| 6,004,066 A | * | 12/1999 | Niemerski ..................... 404/6 |
| 6,203,060 B1 | * | 3/2001 | Cech et al. ................. 280/735 |
| 6,209,909 B1 | * | 4/2001 | Breed .......................... 280/735 |
| 6,343,810 B1 | * | 2/2002 | Breed ....................... 280/730.2 |
| 6,427,520 B2 | * | 8/2002 | Kim .......................... 73/12.04 |

* cited by examiner

Primary Examiner—Max Noori
Assistant Examiner—Anoze Allen
(74) Attorney, Agent, or Firm—Kenyon & Kenyon

(57) ABSTRACT

A device for sensing a side impact in a motor vehicle, the side impact sensing being performed with a deformation sensor element which is attached on a sensor bottom plate, which is in turn mounted on a side part reinforcing element with riveted connections. A temperature sensor which is also present on the sensor bottom plate detects the ambient temperature in the side part and the deformation sensor delivers a static output signal to ascertain whether the riveted connections still have a predetermined mechanical strength. If the temperature measured by the temperature sensor exceeds room temperature, the static output signal of the deformation sensor is checked with the predetermined threshold value, and if it falls below this threshold value, a defect is detected.

9 Claims, 3 Drawing Sheets

DEVICE FOR SENSING A SIDE IMPACT IN A MOTOR VEHICLE

BACKGROUND INFORMATION

It is already known that a deformation sensor may be used in a side part of a motor vehicle for sensing a side impact, to record plastic deformation of the outer skin on the side part. A deformation sensor element of the deformation sensor is attached to a bottom plate of the sensor, which is in turn mounted on a side part reinforcing element using riveted connections. In addition, an analyzer unit which is connected to the deformation sensor and a digital interface which transmits data to a control unit for restraint devices are also provided on the bottom plate of the sensor.

SUMMARY OF THE INVENTION

The device according to the present invention for sensing a side impact in a motor vehicle has the advantage over the related art that it is possible to check the riveted connections for integrity and solidity during the lifetime of the vehicle. To do so, a static output signal of the deformation sensor is used to advantage and is compared with a predetermined threshold value to ascertain whether the mechanical strength of the riveted connections is still within predetermined parameters. Mechanical strength of the riveted connections is an absolute necessity for correct functioning of the deformation sensor for sensing a side impact, so that according to the present invention, inadequate strength of the two riveted connections leads to a warning. Such a warning is then output over an airbag warning lamp, for example.

It is especially advantageous that the sensor bottom plate is made of a metal, preferably a steel, having a higher thermal expansion coefficient than the metal or steel of the side part reinforcing element. As in the known bimetal effect, this results in a temperature-dependent static bending of the bottom plate of the sensor with respect to the side part reinforcing element. This then yields a static signal of the deformation sensor. According to the present invention, this static signal is then compared with a predetermined threshold value, which leads to a warning if the static signal is below the threshold and if the temperature in the side parts is above room temperature.

In addition, it is advantageous that the deformation sensor element is designed as a strain gauge sensor. Most serious side impact situations in terms of injury are detectable after a period of only 3 to 5 ms by using a strain gauge sensor. The deployment threshold of an acceleration sensor which is provided on the B pillar of a motor vehicle, for example, may be lowered immediately with a signal generated by the strain gauge sensor, so that the side airbags for protecting the head and chest area of the vehicle passengers may be activated promptly. Strain gauge sensors may be riveted in an advantageous manner to the deformation body, the onset of whose elastic deformation is to be sensed, so that defective components can be simply replaced, but the part to be monitored, i.e., the side part of a vehicle, may remain in use. To this end, the strain gauge sensor may be easily riveted to a side part reinforcement, e.g., a reinforcing pipe, in the door cavity, thereby eliminating complicated direct welding or gluing onto the deformation part. It is advantageous here that the strain gauge or deformation sensor is usable for side impact sensing in combination with at least one acceleration sensor, so that the acceleration sensor here functions as a plausibility sensor. As explained above, this is able to make side impact sensing faster and more reliable. A shortened period of time until side impact sensing is also possible in combination with a pressure sensor.

In addition, it is advantageous that the deformation sensor is welded to the sensor bottom plate. This is a simple and reliable method of joining.

The temperature sensor together with the analyzer unit may be manufactured to advantage as a chip, so that no additional space on the sensor plate need be provided for the temperature sensor.

It is also advantageous that the sensor bottom plate is designed to be flexurally slack, so that the sensor bottom plate has only an insignificant influence on deformation of the side part reinforcing element. Therefore, this does not have any negative effect on the measurement by the deformation sensor.

Finally, it is also advantageous that a flexible circuit board is attached to the top side of the sensor bottom plate as a connection carrier for the deformation sensor, the analyzer unit and the temperature sensor.

DETAILED DESCRIPTION

Rapid sensing of a side impact in a motor vehicle is of imminent importance for the safety of the passengers in the vehicle because of the very small deformation zone of the vehicle there in comparison with a front impact. Various sensing concepts have already been proposed, including measurement of the acceleration in the lateral direction, measurement of a pressure rise in a side part of a vehicle and deformation of the outer skin of the side part. A deformation sensor is used in particular, a strain gauge sensor here. Since this sensor is mounted on a sensor bottom plate, and the sensor bottom plate is mounted on a side part reinforcing element with riveted connections, the mechanical strength of these riveted connections must be checked. This is true in particular during the entire lifetime of the vehicle.

Therefore, according to the present invention a static output signal of the deformation sensor is compared with a predetermined threshold value which, when the output signal drops below the threshold value, means a loss of mechanical strength if a temperature sensor mounted according to the present invention indicates an increase in temperature above room temperature. A control unit for restraint devices analyzes these signals and if appropriate delivers a warning in the event of a defect in the riveted connections.

Figure 1:
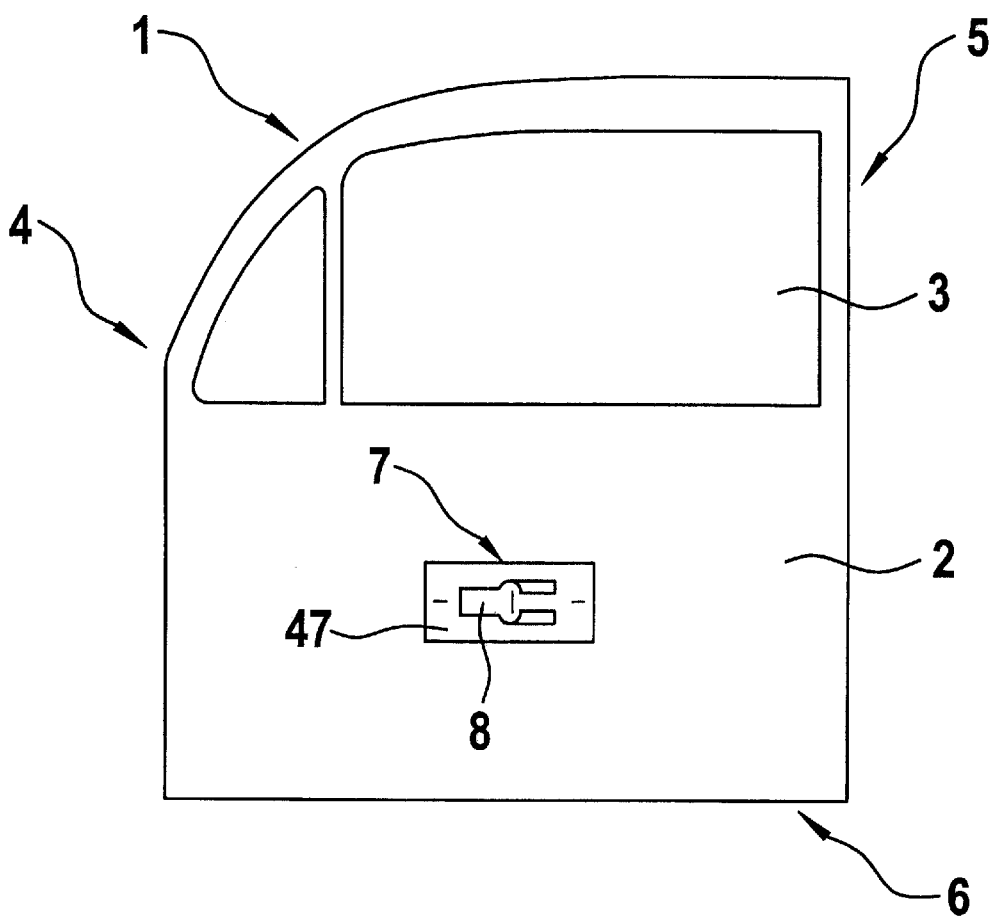
FIG. 1 shows a view of a side part with predetermined mounting positions for the deformation sensor.

FIG. 1 shows a view of a side part of a motor vehicle having a predetermined mounting position for the deformation sensor in the interior of the side part on a side part reinforcing element, namely a reinforcing pipe here. Side part 1 includes a door surface 2 and a recess 3 for the window area. The A-pillar area is shown as 4 and the B-pillar area is identified as 5. The door threshold area on the bottom side of side part 1, i.e., a vehicle door here, is labeled as 6. A sensor 47 in the form of a strain gauge sensor (DMS)

is arranged in sensor position 7 approximately opposite the center of door surface 2 on the reinforcing element in the interior of the door. In the configuration according to FIG. 1, sensor element 8, which senses the deformation of the reinforcing element, is designed as a single strain gauge resistor.

Sensor element 8 is designed to be sensitive to elongation and compression in the micrometer range and has a K factor of approximately 2. This means that the resistance of sensor element 8 changes by 2% with a 1% change in length of the strain gauge. Very precise deformation sensors, i.e., force measurement sensors, may be implemented by using strain gauges. Furthermore, strain gauge sensors permit a single change in length of approximately 10%. Sensor elements 8 used in the diagram according to FIG. 1 cover an area of approximately 0.1 cm$^2$, so that the deformation of the door reinforcing element required for a 10% change in length of strain gauge sensor element 8 would be far into the plastic range. This means that long before strain gauge sensor element 8 has been destroyed, the side airbags will be deployed due to exceeding the 10% change in length.

Figure 2:
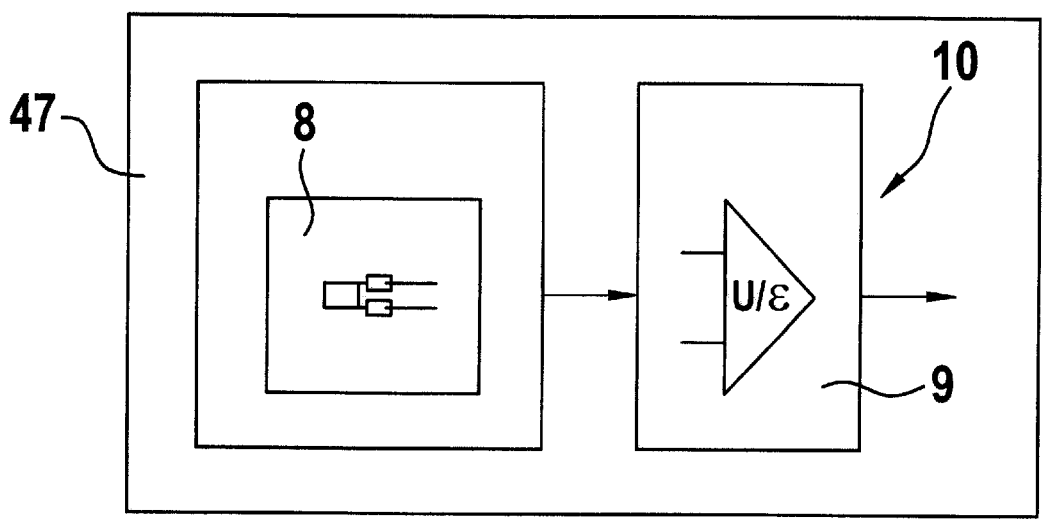
FIG. 2 shows the amplifier circuit in a schematic diagram.

FIG. 2 shows an analyzer circuit or an amplifier arrangement for strain gauge sensor element 8. Deformation sensor 47 has strain gauge sensor element 8 and an amplifier arrangement 10 which processes the output signals of strain gauge element 8. The deformation of the door reinforcing element may cause a lengthening or compression of strain gauge resistor 8. Therefore, the absolute value of the change in this gauge is monitored in the deployment algorithm software of the airbag control unit for whether or not one or more thresholds is exceeded.

In contrast with the absolute weight sensing required for classification of passengers, an analysis of the dynamic change in signal is sufficient with any impact detection. The precise lower corner frequency for the deployment algorithm input signal is set with an accurately defined software high pass. However, the configuration according to FIG. 2 shows a d.c. amplifier 9 with which temperature induced static changes in the DMS signal may also be analyzed. The main element of amplifier arrangement 10 is d.c. voltage amplifier 9.

Figure 5:
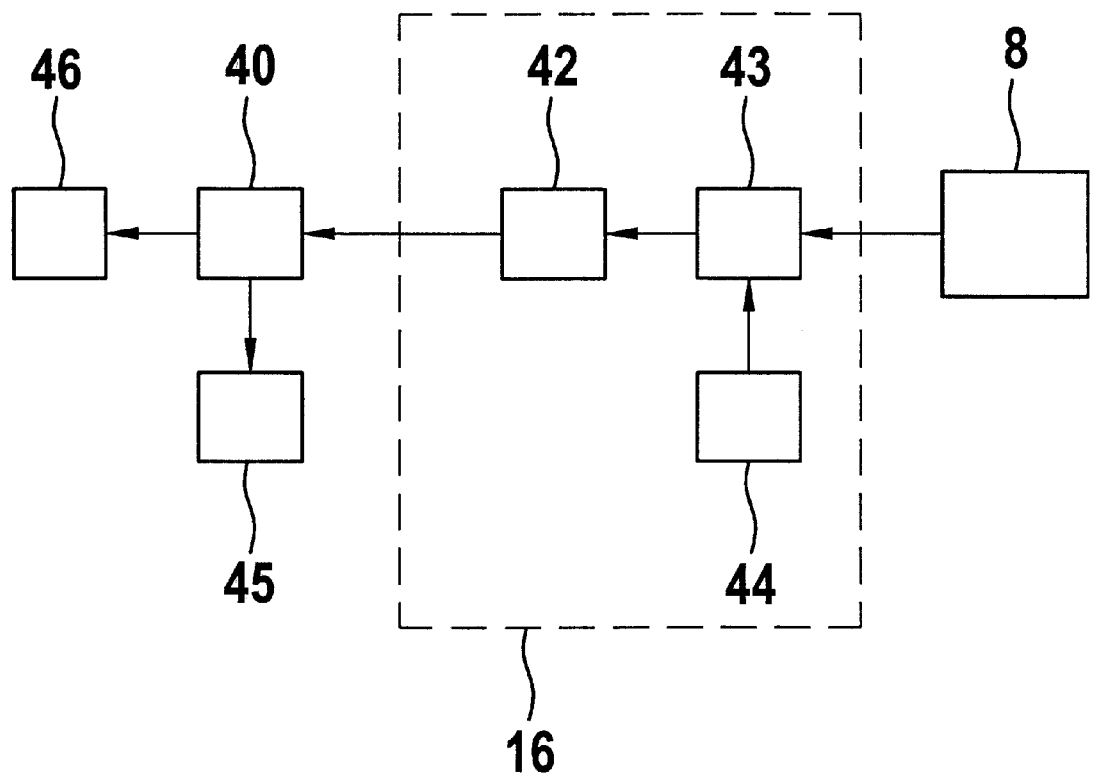
FIG. 5 shows a block diagram of the device according to the present invention.

FIG. 5 shows a block diagram of the device according to the present invention for side impact sensing in a motor vehicle. Deformation sensor element 8 is connected to a first input of an analyzer circuit 43. A temperature sensor 44 is connected to a second input of analyzer circuit 43. Analyzer circuit 43 is connected to a digital interface 42 over a data output. Digital interface 42 is connected over a data line 41 to a control unit 40 for restraint devices 45. Restraint devices 45, i.e., airbags or seat-belt tightening systems, are connected to a first data output of control unit 40. A warning device 46, namely a warning light here, for restraint devices 45 is connected to a second data output of control unit 40.

Temperature sensor 44, analyzer circuit 43 and digital interface 42 together form analyzer unit 16 which is implemented on a chip, or on an ASIC (application-specific integrated circuit). Output signals of deformation sensor element 8 are amplified and digitized by analyzer circuit 43 and optionally compared with a first threshold value. Signals from temperature sensor 44 are also digitized by analyzer circuit 43 and then transmitted over digital interface 42 and data line 41 to control unit 40 which compares the output signals of deformation sensor 47 and temperature sensor 44 with predetermined threshold values. In particular, the static output signal of deformation sensor 8 is of interest here. If this static output signal drops below a predetermined value and if the temperature is above room temperature, then it is clear that the bending of the sensor bottom plate with respect to the side part reinforcing element would not have been allowed by the original mechanical strength of the rivets. This is a defect and is signaled by warning device 46.

To determine the room temperature, control unit 40 uses either a stored value or another sensor, e.g., in the interior, i.e., in the passenger compartment. If strain gauge 8 delivers a signal indicating future plastic deformation of the side part, then control unit 40 detects this with additional analysis algorithm threshold values and optionally activates restraint devices 45. To do so, an acceleration sensor may also be used to reliably detect a side impact. It is also possible for deformation sensor 47 to ensure that the deployment threshold for the acceleration sensor is lowered because a side impact seems probable. The acceleration sensor then acts as a plausibility sensor for side impact confirmation. Data line 41 may be designed here as a bus, but a two-wire conductor is also possible.

Figure 3:
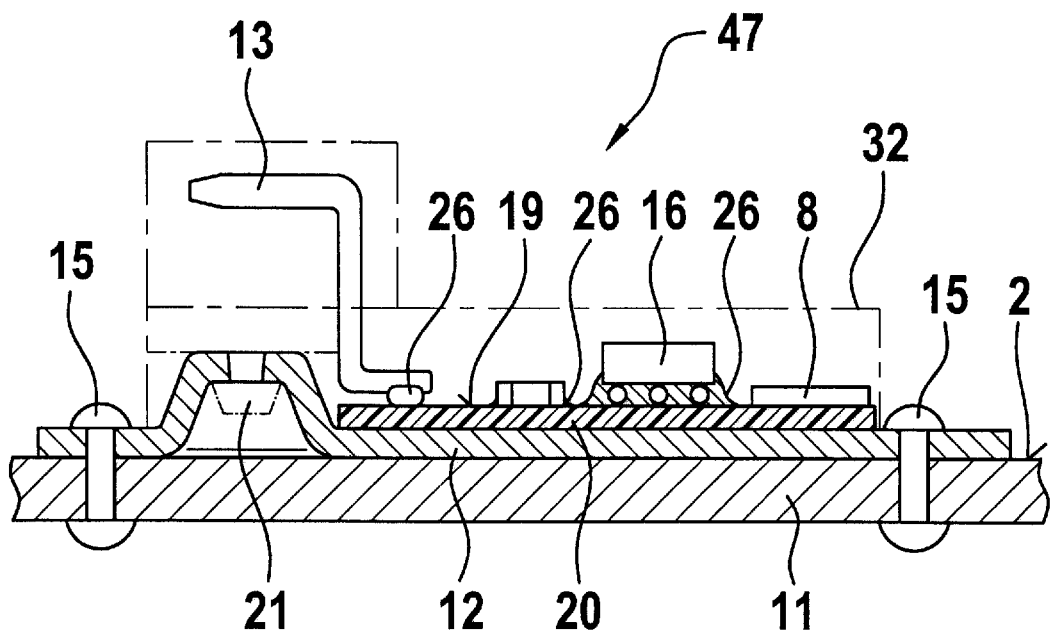
FIG. 3 shows the design principle of a strain gauge sensor.

FIG. 3 shows the design principle of a strain gauge sensor. A sensor 47 is accommodated on door reinforcing element 11 of such a motor vehicle door. Door reinforcing element 11 may be designed with different plate metal thicknesses, but with today's passenger vehicles, the door plate thickness may vary between 0.5 mm and 1 mm, depending on the manufacturer. Sensor element 8 according to FIG. 3 is accommodated on a sensor bottom plate, shown here as steel plate 12. This sheet steel bottom plate 12 has a thickness of 0.5 mm here and is sealed with a plastic cover 32. Sensor bottom plate 12 is detachably attached to door reinforcing element 11 in the cavity of a motor vehicle side part by using a separable attachment in the form of rivets. This type of attachment has the advantage that it is possible to remove a defective sensor 47 from its installation position 7 in the side part interior, while component 1, such as a motor vehicle door, may continue to be used, and it is not necessary to replace a complete side door 1 when the sensor is defective. A circuit board 20, on whose top side 19 are a number of electronic components in the form of ceramic chip capacitors, terminal elements 13 and an analyzer unit 16 (ASIC), shown here in flip-chip mounting technology, is mounted on sensor bottom plate 12.

Figure 4:
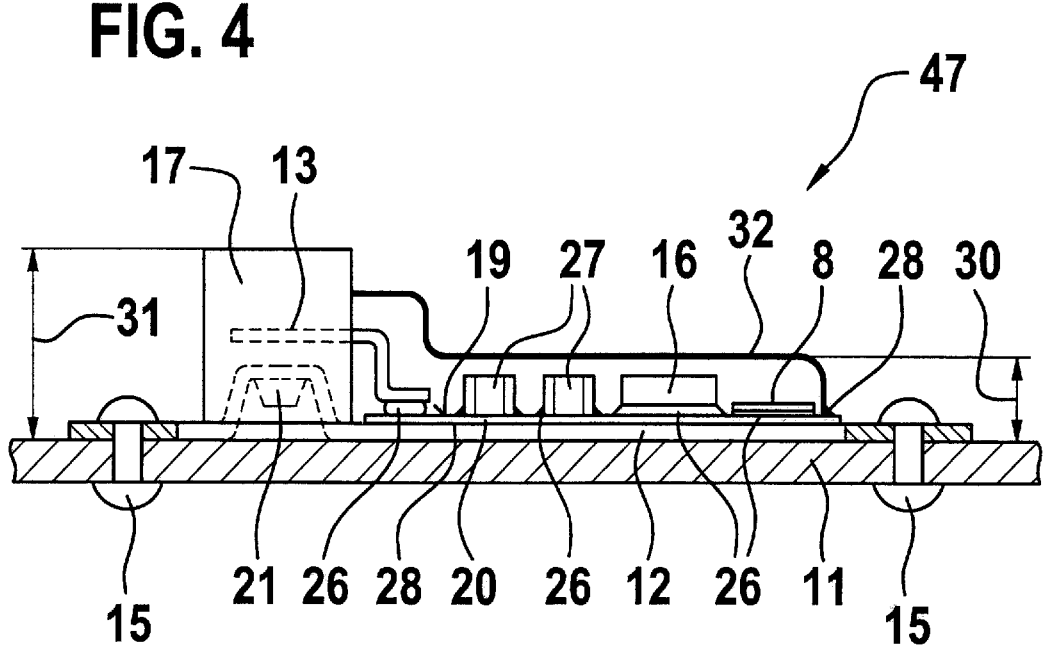
FIG. 4 shows a side view of the strain gauge sensor having an engaged plug together with plug lugs.

The diagram according to FIG. 4 shows in greater detail a side view of a strain gauge sensor element having plug connector element 17 engaged on sensor bottom plate 12 and plug lugs 13 accommodated on it. Sensor 47 according to FIG. 4 is accommodated on the side of a door reinforcing element 11 by separable fastening rivets 15, by analogy with the diagram of sensor 47 according to FIG. 3. Sensor bottom plate 12 is preferably only 0.5 mm thick and accommodates a circuit board 20 on its top side, which is mounted on the top side of sensor bottom plate 12 with a temperature-resistant adhesive 28. Flexible circuit board 20 is made of a Kapton film and functions as a component and connecting conductor carrier for strain gauge sensor element 8, which may be designed in the form of a nickel, chromium or constantan layer and is welded to an insulation layer on sensor bottom plate 12.

Flexible circuit board 20 also functions as a carrier for analyzer unit 16 and a number of discrete ceramic chip capacitors 27. The height of the structure from sensor arrangement 47 of the door reinforcing element 11 to the top side of cover 32 which covers the circuit arrangement amounts to only a few millimeters and is labeled as 30. In the embodiment according to FIG. 4, this height amounts to only approximately 6 mm. In the area of plug element 17, which is accommodated on the top side of the sensor bottom plate by two catch projections 21, the total height labeled as 31 amounts to about 18 mm. Plug lugs 13 which are shown with dotted lines in the area of their course through plug 17 are connected by a reflow solder connection 26 to circuit board 20 accommodating the electronic components.

After sputtering the strain gauge sensor onto Kapton film 20 and gluing it to sensor bottom plate 12 using temperature-resistant adhesive bond 28, the inserted electronic components and the two plug lugs 13 are connected in a single reflow soldering operation 26. Plug housing 17 is advantageously locked to sensor bottom plate 12 with molded catch projections 21. Because of the deep-drawn cavern in sensor bottom plate 12, enough room for plug catch projections 21 is present between door reinforcing element 11 and the bottom side of sensor bottom plate 12.

Plastic cover 32 of strain gauge sensor 47 is engaged only on plug housing 17, for example. To guarantee that it will be watertight to protect it from spray water or rainwater penetrating into a door seal, the cover is glued all the way around with an adhesive 28 to steel sensor bottom plate 12 mounted on door reinforcing element 11 at rivets 15.

What is claimed is:

1. A device for sensing a side impact in a motor vehicle, comprising:

a deformation sensor for side impact sensing in a side part of the vehicle, the deformation sensor including a deformation sensor element;

a sensor bottom plate attached to the deformation sensor element of the deformation sensor;

a side part reinforcing element, the sensor bottom plate being mounted on the side part reinforcing element using riveted connections;

an analyzer unit connected to the deformation sensor element;

a control unit associated with restraint devices of the vehicle;

a digital interface situated on the sensor bottom plate, the digital interface being connected to the control unit; and a temperature sensor for transmitting a first output signal over the digital interface to the control unit, the temperature sensor being situated on the sensor bottom plate, wherein the deformation sensor element transmits a second static output signal over the digital interface to the control unit, and wherein, when the first output signal indicates a temperature above room temperature, and the second output signal is below a predetermined threshold value, the control unit detects a defect in the riveted connections and then delivers a warning.

2. The device according to claim 1, wherein the sensor bottom plate is composed of a metal having a higher thermal expansion coefficient than a metal of the side part reinforcing element.

3. The device according to claim 1, wherein the deformation sensor element is a strain gauge sensor.

4. The device according to claim 1, wherein the deformation sensor is for sensing a side impact in combination with at least one acceleration sensor.

5. The device according to claim 1, wherein the deformation sensor is welded to the sensor bottom plate.

6. The device according to claim 1, wherein the temperature sensor and the analyzer unit are in the form of a chip.

7. The device according to claim 1, further comprising a d.c. amplifier for amplifying the second output signal.

8. The device according to claim 1, wherein the sensor bottom plate is flexurally slack.

9. The device according to claim 1, further comprising a flexible circuit board attached to a top side of the sensor bottom plate as a connecting conductor carrier for the deformation sensor element, the analyzer unit and the temperature sensor.

* * * * *